(12) United States Patent
Hasegawa et al.

(10) Patent No.: US 6,526,209 B1
(45) Date of Patent: Feb. 25, 2003

(54) OPTICAL FIBER HAVING IMPROVED OPTICS AND STRUCTURE

(75) Inventors: Takemi Hasegawa, Yokohama (JP); Eisuke Sasaoka, Yokohama (JP); Masayuki Nishimura, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 70 days.

(21) Appl. No.: 09/709,406

(22) Filed: Nov. 13, 2000

(30) Foreign Application Priority Data

Apr. 17, 2000 (JP) .......................... 2000-115524
May 1, 2000 (JP) .......................... 2000-132668

(51) Int. Cl.$^7$ .............................. G02B 6/02; G02B 6/22
(52) U.S. Cl. ...................... 385/127; 385/126; 385/127; 385/28
(58) Field of Search .................. 385/123, 126, 385/127, 11, 28

(56) References Cited

U.S. PATENT DOCUMENTS

| | | | |
|---|---|---|---|
| 5,802,236 A | 9/1998 | DiGiovanni et al. | 385/127 |
| 5,854,871 A | 12/1998 | Akasaka | 385/123 |
| 5,894,537 A | 4/1999 | Berkey et al. | 385/123 |
| 5,907,652 A | 5/1999 | DiGiovanni et al. | 385/125 |
| 6,097,870 A | 8/2000 | Ranka et al. | 385/127 |

FOREIGN PATENT DOCUMENTS

| | | |
|---|---|---|
| EP | 0737873 A2 | 10/1996 |
| JP | 10-95628 | 4/1998 |
| JP | 10-325913 | 12/1998 |
| WO | WO 99/00685 | 1/1999 |
| WO | 00/16141 | 3/2000 |
| WO | WO 00/16141 | 3/2000 |

OTHER PUBLICATIONS

"Solution effects in photonic crystal fibres at 850nm", W.J. Wadsworth, et al., Electronics Letters, Jan. 6, 2000, vol. 36, No. 1, p. 53–55.

"Recent progress in photonic crystal fibres", P.St.J. Russel et al., Optical Fiber Communication Conference, p. 98–101. No date.

"Designing a photonic crystal fibre with flattened chromatic dispersion", A. Ferrando et al., Electronics Letters, Feb. 18, 1999, vol. 35, No. 4, p. 325–327.

"Cyndrically symmetrical hollow fiber", Jianqui Xu et al., Elsevier Science B.V., Aug. 15, 2000, vol. 182, p. 343–348.

"High–dispersion–Compensation Ability and Low Nonlinearity of W–Shaped DCF", by Akasaka et al., OFC'96 Technical Digest, p. 201–202.

"Side–Tunnel Fibre: An Approach to Polarisation–Maintaining Optical Waveguiding Scheme", Electronics Letters, vol. 18, No. 19 (Sep. 16, 1982), p. 824–826.

"Soliton Effects in Photonic Crystal Fibres at 850 nm", by Wadsworth et al., Electronics Letters vol. 36, No. 1 (Jan. 6, 2000), p. 53–56.

Primary Examiner—Javaid Nasri
(74) Attorney, Agent, or Firm—McDermott, Will & Emery

(57) ABSTRACT

In an optical fiber comprising a core region, an inner cladding region, and an outer cladding region which extend along its fiber axis, the average refractive index $n_0$ of core region, the average refractive index $n_1$ of inner cladding region, and the average refractive index $n_2$ of outer cladding region satisfying the relationship of $n_1 < n_2 < n_0$; at least three microstructures each extending along the fiber axis and comprising an auxiliary medium having a refractive index different from that of a main medium constituting the inner cladding region are included in the inner cladding region.

16 Claims, 14 Drawing Sheets

OPTICAL FIBER HAVING IMPROVED OPTICS AND STRUCTURE

BACKGROUND OF THE INVENTION

1. Field of the Invention

The present invention relates to an optical fiber suitable as an optical transmission line or dispersion compensator.

2. Related Background Art

The following optical fibers have conventionally been known, for example. A microstructured optical fiber disclosed in Japanese Patent Application Laid-Open No. HEI 10-95628 has a core region, which is usually solid, surrounded by a cladding region that comprises a multiplicity of spaced apart cladding features that are elongate in the axial direction and disposed in a first cladding material. The core region has an effective diameter $d_0$ and an effective refractive index $N_0$. Each cladding feature has a refractive index that differs from that of the first cladding material, and the cladding region has an effective refractive index that is less than $N_0$. Further, it is disclosed that a large dispersion is obtained since the cladding region comprises an inner cladding region having an effective refractive index $N_{cl}$ and an outer cladding region having an effective refractive index $N_{co}$ (where $N_{cl} < N_{co}$).

OFC'96 Technical Digest, ThA3 discloses an optical fiber having a W-shaped refractive index profile, and discloses that a low chromatic dispersion (with a large negative value) can be realized in this optical fiber.

Electronics Letters, vol. 18, pp. 824–826 (1982) discloses that, by being provided with "side tunnels" on both sides of a core region, not only high normalized birefringence is realized, but also the cutoff frequency difference between two polarization modes is enlarged, whereby an absolutely single-polarization optical fiber can be realized.

U.S. Pat. No. 5,907,652 discloses the following air-clad optical fiber. Namely, it is a silica-based optical fiber comprising, successively from the fiber center toward the outer periphery, a core region, an inner cladding region, a first outer cladding region, and a second outer cladding region, in which the refractive index of inner cladding is less than that of the core region, and the effective refractive index of first outer cladding region is less than 1.35. Also, the first outer cladding region is selected such that optical characteristics of the optical fiber do not depend on the second outer cladding region. It discloses that the air-clad optical fiber is suitable for cladding-pumped optical fiber lasers and long-period fiber gratings.

SUMMARY OF THE INVENTION

In the microstructured optical fiber disclosed in JP 10-95628A, however, microstructures are distributed over the whole cladding, whereby the number of microstructures is large. For example, the above-mentioned publication states that "Our simulations indicate that at least 4 layers of second capillary features should be provided." In this case, the number of capillary features would be at least 90, thus becoming large. If the number of microstructures is large as such, then the making becomes difficult. According to the above-mentioned publication, the process of making the microstructured optical fiber is as follows. Namely, silica capillary tubes and a silica rod with no bore are prepared, a tube bundle is formed by arranging a number of silica tubes around the silica rod, the tube bundle and an over cladding tube are collapsed so as to yield a preform, and then an optical fiber is drawn from this preform. However, it takes time and effort to form a tube bundle by arranging small-diameter silica tubes into a bundle without disorder. Also, since there is a strong possibility of the arrangement being disordered, the making with a favorable reproducibility is hard to achieve. The making becomes more difficult as the number of microstructures increases.

On the other hand, a step of boring a preform of a conventional impurity-doped type optical fiber by use of a boring device may be used instead of the above-mentioned making process. Even in the case using this step, however, the conventional microstructured optical fiber has a number of microstructures, whereby the cost of manufacture becomes high.

Also, the optical fiber disclosed in the above-mentioned publication has problems as follows in particular when the microstructures are bores. First, the mechanical strength of optical fiber is lowered due to the bores included therein, whereby strengths against tension and lateral pressures may decrease. Second, there is a possibility of absorption loss occurring due to OH group on surfaces of bores and water vapor within the bores. Therefore, during operations of making or fiber connection, a treatment for lowering the possibility of water vapor entering the bores is necessary, which makes the operations difficult. Third, if glass melts upon fusion splicing and thereby closes bores, then the effective refractive index difference between the core and cladding is lost, so that the optical power leaking out into the cladding remarkably increases, whereby propagation loss becomes greater at the fused part. The first and second problems become more influential as the number of microstructures increases.

On the other hand, the refractive index difference realizable in the impurity-doped type optical fiber disclosed in OFC'96 Technical Digest, ThA3 is small. As a result, realizable value ranges are restricted in terms of the magnitude of absolute value of negative dispersion, magnitude of absolute value of negative dispersion slope, size of effective core area, and reduction of bending loss.

The optical fiber disclosed in Electronics Letters, vol. 18, pp. 824–826 (1982) yields a large linear birefringence with "side tunnels" of air provided on both sides of its core. However, it is desirable that birefringence be smaller for optical transmission application, such as those in which the optical fiber is incorporated in a part of an existing optical transmission line in particular. If the polarization state of light incident on an optical fiber having a large birefringence does not match either of the principal polarization states of fiber, then transmission quality deteriorates due to polarization mode dispersion. Hence, a device for making the polarization state of incident light constant is necessary, which raises the cost. Also, most of existing optical transmission lines have no polarization selectivity, whereby the polarization state of light emitted therefrom is not constant. Thus, the polarization state of light having an inconstant polarization state is hard to keep constant.

In the air-clad optical fiber disclosed in U.S. Pat. No. 5,907,652, a chromatic dispersion having a large negative value and a chromatic dispersion slope having a large negative value are hard to obtain. This is because of the fact that this optical fiber is mainly aimed at lowering the effective refractive index of first outer cladding region, so as to prevent the second outer cladding region from influencing optical characteristics.

In view of such circumstances, it is an object of the present invention to provide an optical fiber which can realize a low chromatic dispersion (having a large negative value), a low chromatic dispersion slope(having a large negative value), a large effective core area, and a low bending loss. It is another object of the present invention to provide an optical fiber facilitating its making, cutting down its cost, improving its strengths against tension and lateral pressures, lowering the possibility of absorption loss occurring due to OH group on surfaces of bores and water vapor within bores, and reducing power loss at fusion splice.

For satisfying the above-mentioned objects, the present invention provides an optical fiber comprising a core region constituted by a substantially homogeneous medium; an inner cladding region surrounding the core region; and an outer cladding region, constituted by a substantially homogeneous medium, surrounding the inner cladding region; wherein the core region, inner cladding region, and outer cladding region are regions extending along a fiber axis and influencing optical characteristics; wherein an average refractive index $n_0$ of the core region, an average refractive index $n_1$ of the inner cladding region, and an average refractive index $n_2$ of the outer cladding region satisfy the relationship of $n_1 < n_2 < n_0$; and wherein the inner cladding region includes at least three microstructures each extending along the fiber axis and comprising an auxiliary medium having a refractive index different from that of a main medium constituting the inner cladding region.

Within a cross section perpendicular to the fiber axis, the core region has a substantially circular form, whereas the inner and outer cladding regions have substantially annular forms. The average refractive index of each of the core region, inner cladding region, and outer cladding region can be given by the following $n_{avg}$:

$$n_{avg} = \left[ \frac{1}{\pi(b^2 - a^2)} \int_a^b n^2(r, \theta) r\, d\theta dr \right]^{\frac{1}{2}} \quad (1)$$

where a is the inner radius of the region (0 in the case of core region), b is the outer radius, r and θ are polar coordinates representing a position within a fiber cross section, and n(r, θ) is a refractive index distribution within the cross section. In general, the average refractive indices in core region, inner cladding region, and outer cladding region vary depending on the respective definitions of regions. The expressions "comprising a core region constituted by a substantially homogeneous medium; an inner cladding region surrounding the core region; and an outer cladding region, constituted by a substantially homogeneous medium, surrounding the inner cladding region" and "an average refractive index $n_0$ of the core region, an average refractive index $n_1$ of the inner cladding region, and an average refractive index $n_2$ of the outer cladding region satisfy the relationship of $n_1 < n_2 < n_0$" mean that there is such a way of defining the core region, inner cladding region, and outer cladding region as to satisfy the above-mentioned inequality. For improving the fiber strength, the outer cladding region may be surrounded with a jacket region made of a material such as glass or resin. Here, it is necessary for the outer cladding region to have a sufficient radial thickness in order to prevent the jacket region from influencing the optical characteristic. On the other hand, the outer cladding region is a region influencing the optical characteristic, whereby the average refractive index and thickness of the inner cladding region are selected such that the outer cladding region influences the optical characteristic.

Each of the core region and outer cladding region is constituted by a substantially homogeneous medium. It means that the main ingredient of the material constituting each of these regions is same in the respective region. Here, a configuration in which the impurity concentration is varied within the region can be employed when appropriate. For example, the core region may be silica glass containing Ge as an impurity while employing a structure in which Ge concentration decreases from the center toward the outer periphery.

The main medium is a medium which can actually constitute the optical fiber by itself. A plurality of main medium regions which are not connected together must not exist in a single optical fiber. On the other hand, the auxiliary medium may be a medium which cannot actually constitute the optical fiber by itself. A plurality of auxiliary medium regions disconnected from each other may exist in a single optical fiber. A typical example of the main medium is silica-based glass, whereas typical examples of the auxiliary medium are gases or liquids.

Thus, in addition to a main medium constituting the inner cladding region, microstructures constituted by an auxiliary medium having a refractive index different from that of the main medium are provided in the inner cladding region of the optical fiber in accordance with the present invention. On the other hand, the outer cladding region is constituted by a substantially homogeneous medium and includes no microstructures. This is based on the inventor's discovery that, for yielding a favorable characteristic such as a dispersion having a large negative value in an optical fiber in which the average refractive index of the inner cladding region is less than that of the outer cladding region, it will be sufficient if the average refractive index of the inner cladding region is lowered by providing microstructures therein without necessitating providing microstructures in the outer cladding region. On the other hand, by being provided with microstructures each of which consists of an auxiliary medium having a refractive index less than that of the main medium, the average refractive index of inner cladding region can be made much lower than that in the case without the microstructures. As a result, favorable characteristics such as a dispersion with a larger negative value, a dispersion slope with a larger negative value, a larger effective core area, and a smaller bending loss can be obtained as compared with the conventional impurity-doped type optical fiber. Also, unlike the air-clad optical fiber, the optical fiber of the present invention can realize a dispersion with a large negative value and a dispersion slope with a large negative value. This is because of the fact that the outer cladding region surrounding the inner cladding region including microstructures influences optical characteristics, such as chromatic dispersion characteristics in particular. Further, since the outer cladding region is constituted by a substantially homogeneous medium and includes no microstructures, the number of microstructures to be provided can be drastically reduced compared to that in the conventional microstructured optical fiber. As a result, the optical fiber can easily be made with a favorable reproducibility using any of the method in which silica tubes are arranged and the method in which a preform is bored by use of a boring device, whereby the cost of manufacture can be cut down.

In the case where the microstructures comprise bores in particular, strengths against tension and lateral pressures improve as compared with the conventional microstructured optical fiber when the number of microstructures decreases, and the making and connecting become easier since the probability of absorption loss occurring due to OH group on surfaces of bores and water vapor within the bores decreases. Further, since the refractive index of core region is higher than that of outer cladding region, the waveguiding function of the fiber will not be lost even if bores are closed in the inner cladding, whereby attenuation due to fusion splice can be reduced.

BRIEF DESCRIPTION OF THE DRAWINGS

FIG. 15A is a sectional view of an optical fiber in accordance with the fourth embodiment in its segment a;

DESCRIPTION OF THE PREFERRED EMBODIMENTS

In the following, embodiments of the present invention will be explained with reference to the drawings.

First Embodiment

Figure 1:
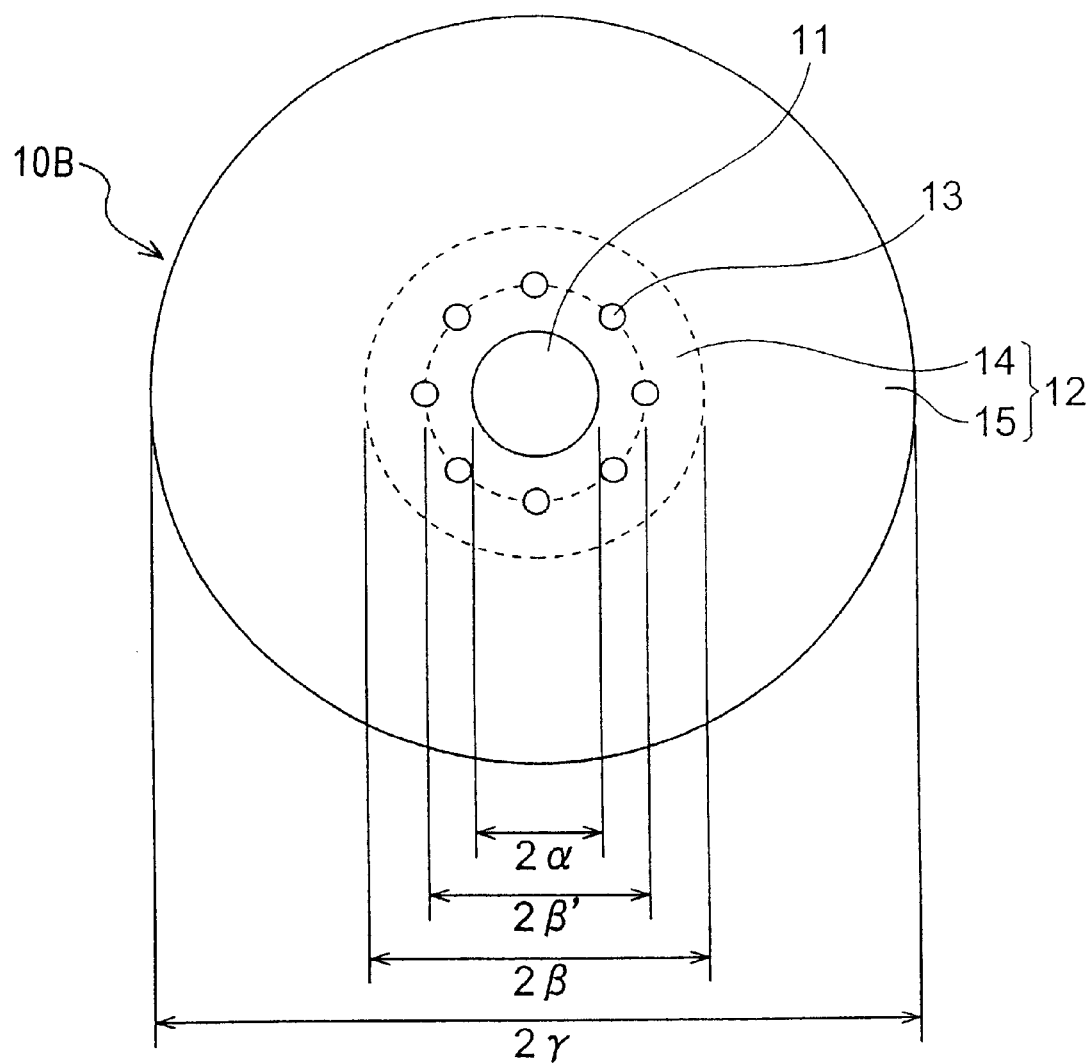
FIG. 1 is a sectional view of an optical fiber in accordance with the first embodiment of the present invention.

FIG. 1 is a sectional view of an optical fiber 10B in accordance with the first embodiment. This optical fiber 10B has a core region 11 having a circular form with a radius $\alpha$ constituted by silica glass (whose refractive index $n_0$=1.46567) doped with Ge having a concentration of 14.5 mol %, whereas a cladding region 12 having an outside radius of $\gamma$ made of pure silica glass (whose refractive index $n_2$=1.44402) surrounds the core region 11. The cladding region 12 is constituted by an inner cladding region 14 surrounding the core region 11 and having microstructures 13 (whose refractive index $n_3$=1), and an outer cladding region 15 surrounding the inner cladding region 14 and including no microstructures 13. The main medium in the inner cladding region 14 is pure silica glass, whereas the auxiliary medium forming the microstructures 13 is air. Eight microstructures 13, each having a circular form with a radius r, are disposed on a circle having a radius $\beta'$ at substantially equal intervals. The outer side of the outer cladding region 15 is coated with a jacket layer constituted by a material such as glass or polymer. While the jacket layer is aimed at improving mechanical performances so as to restrain microbend from occurring and improve the strength of fiber, for example, the outer cladding region 15 is so thick that the influence of the jacket layer upon optical characteristics is negligible. The boundary between the inner cladding region 14 and outer cladding region 15 is defined by a circle having a radius of $\beta=2\beta'-\alpha$ (which indicates that $\beta$ is the mean of $\beta'$ and $\alpha$, i.e., the center of microstructures 13 is located at a position equally distanced in a radial direction from the boundary between the inner cladding region 14 and core region 11 and from the boundary between the inner cladding region 14 and outer cladding region 15.

Structural parameters of the optical fiber 10B are as follows: $\beta'/\alpha=1.94$, $r/\alpha=0.135$, $\gamma/\alpha=18.3$.

Here, letting a be the inside radius of each region (0 in the case of core region) and b be the outside radius thereof, the position within a fiber cross section is represented by polar coordinates, whereby the refractive index distribution within the cross section using the polar coordinates is given by n(r, $\theta$). Then, the average refractive index $n_{avg}$ of the region is given by the following equation:

$$n_{avg} = \left[ \frac{1}{\pi(b^2 - a^2)} \int_a^b n^2(r, \theta) r\, d\theta\, dr \right]^{\frac{1}{2}} \tag{1}$$

From this equation, the following expression can simply give an average refractive index $n_{avg}$ in a predetermined region constituted by a main medium region having a uniform refractive index $n_m$, microstructures formed by an auxiliary medium having a refractive index $n_s$ different from the refractive index $n_m$ exists:

$$n_{avg} = \sqrt{\frac{A_m}{A_m + A_s} n_m^2 + \frac{A_s}{A_m + A_s} n_s^2} \tag{2}$$

where $A_m$ and $A_s$ are cross areas of the main medium region and the microstructures, respectively.

From expression (2) and the above-mentioned individual parameters, the average refractive index $n_1$ of inner cladding region 14 becomes 1.4366.

Figure 2:
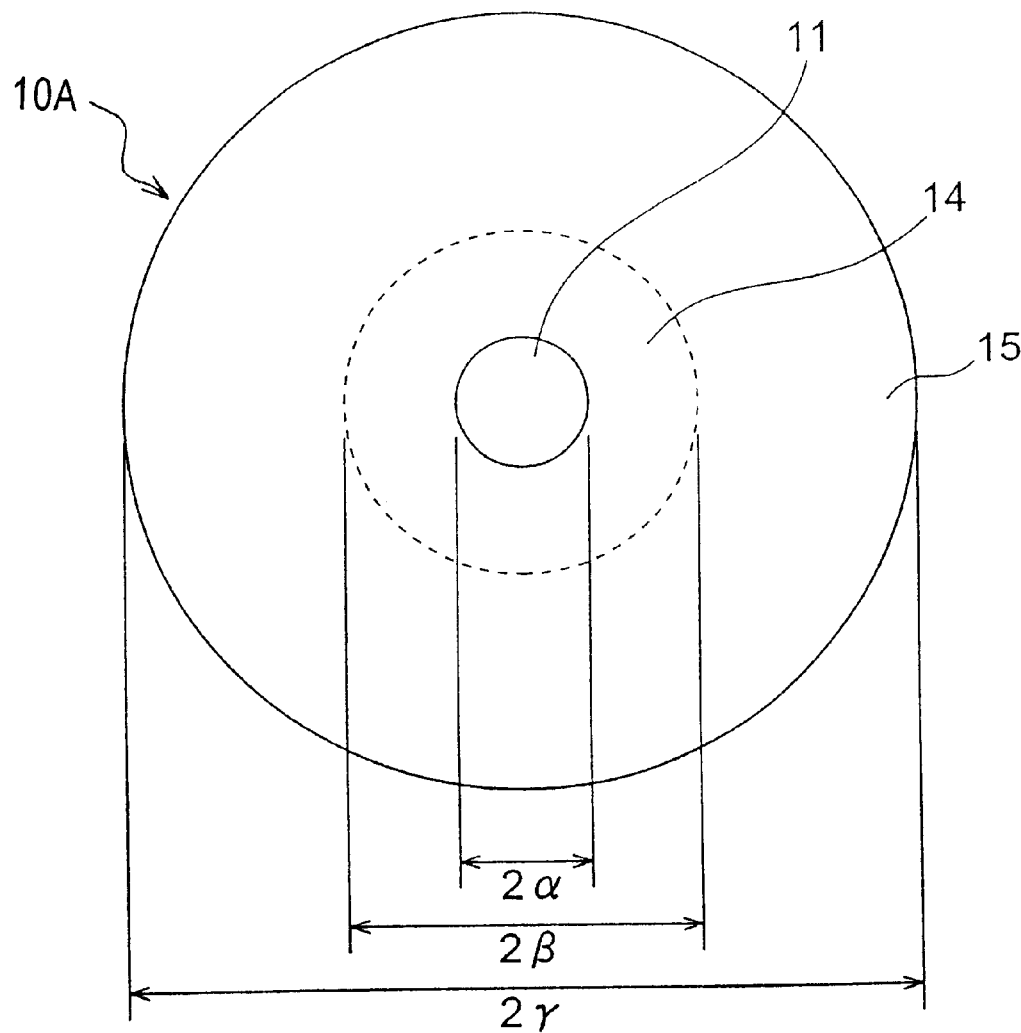
FIG. 2 is a sectional view of a conventional impurity-doped type optical fiber for comparison.

FIG. 2 is a sectional view of a conventional impurity-doped type optical fiber 10A for comparison. In the optical fiber 10A, the material of core region 11 is silica having a Ge concentration of 14.5 mol %, the material of inner cladding 14 is silica having an F concentration of 1.113 wt %, and the material of outer cladding region 15 is pure silica.

Structural parameters of the optical fiber 10A are as follows: $\beta/\alpha=2.88$, $\gamma/\alpha=18.3$.

Figure 3:
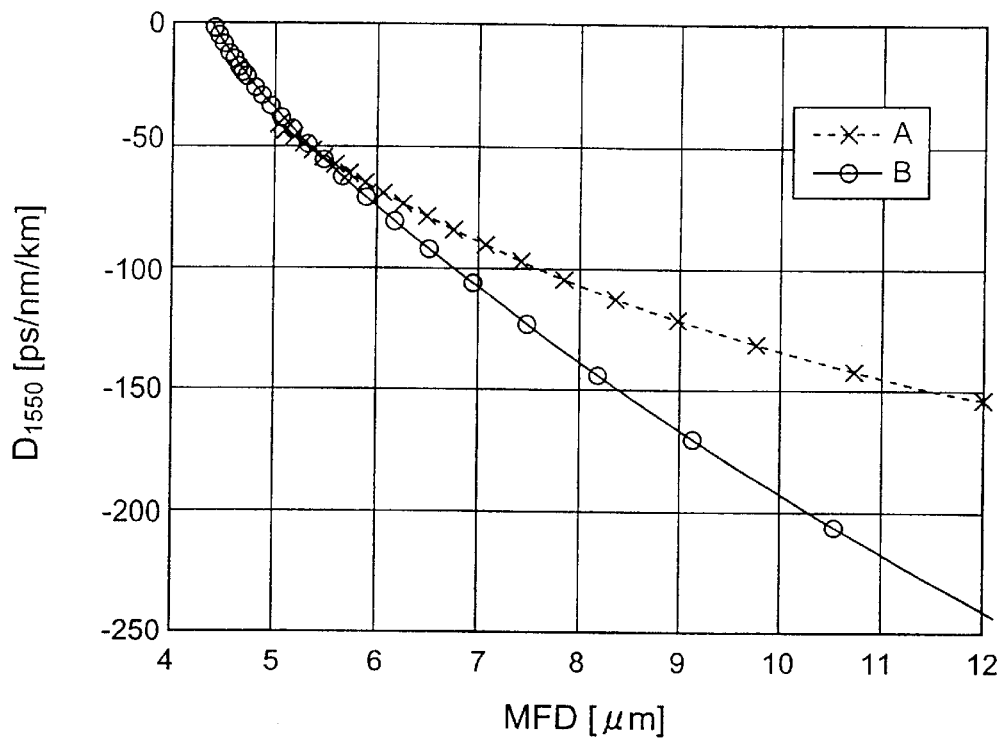
FIG. 3 is a chart showing relationships between the mode field diameter and the chromatic dispersion at a wavelength of 1550 nm.
Figure 4:
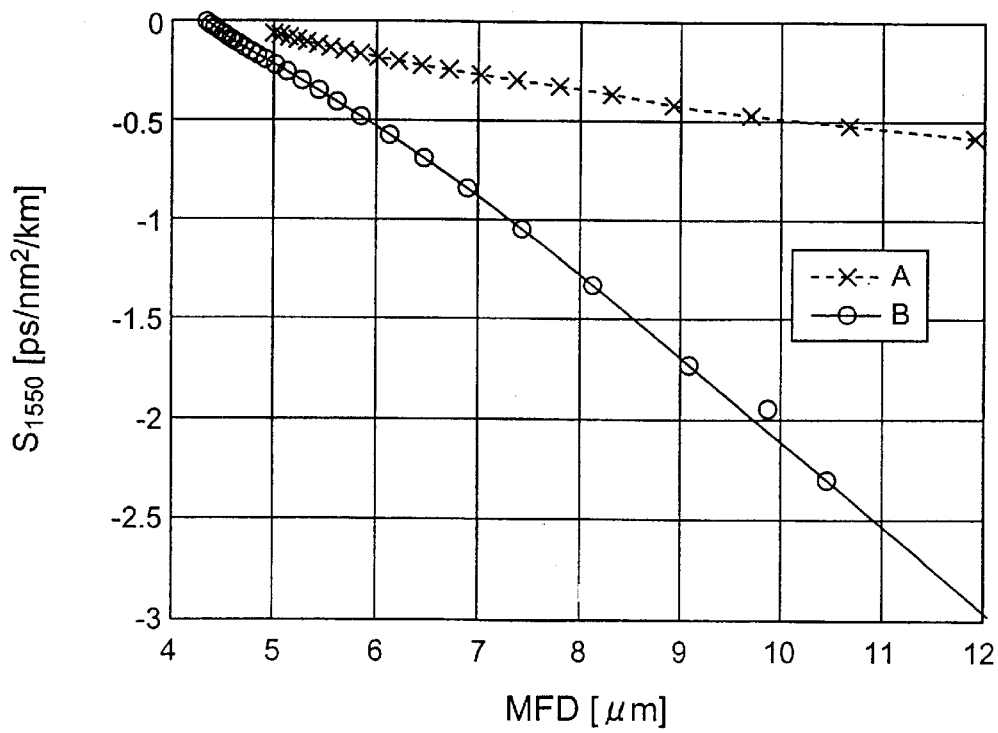
FIG. 4 is a chart showing relationships between the mode field diameter and the chromatic dispersion slope at a wavelength of 1550 nm.
Figure 5:
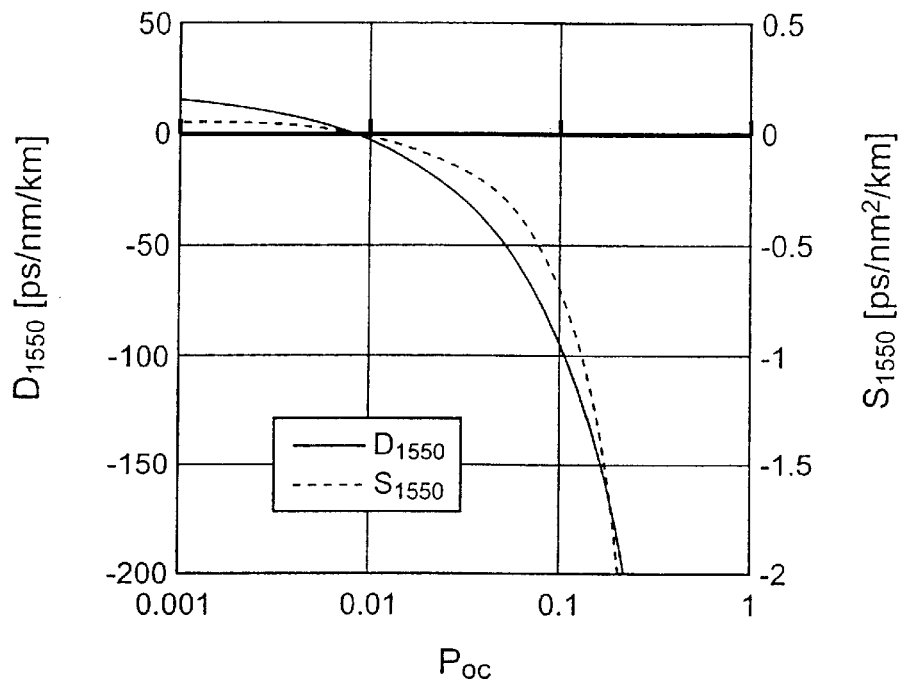
FIG. 5 is a chart showing relationships between the ratio of optical power propagating through the outer cladding region to the total power and the chromatic dispersion and chromatic dispersion slope at a wavelength of 1550 nm.
Figure 6:
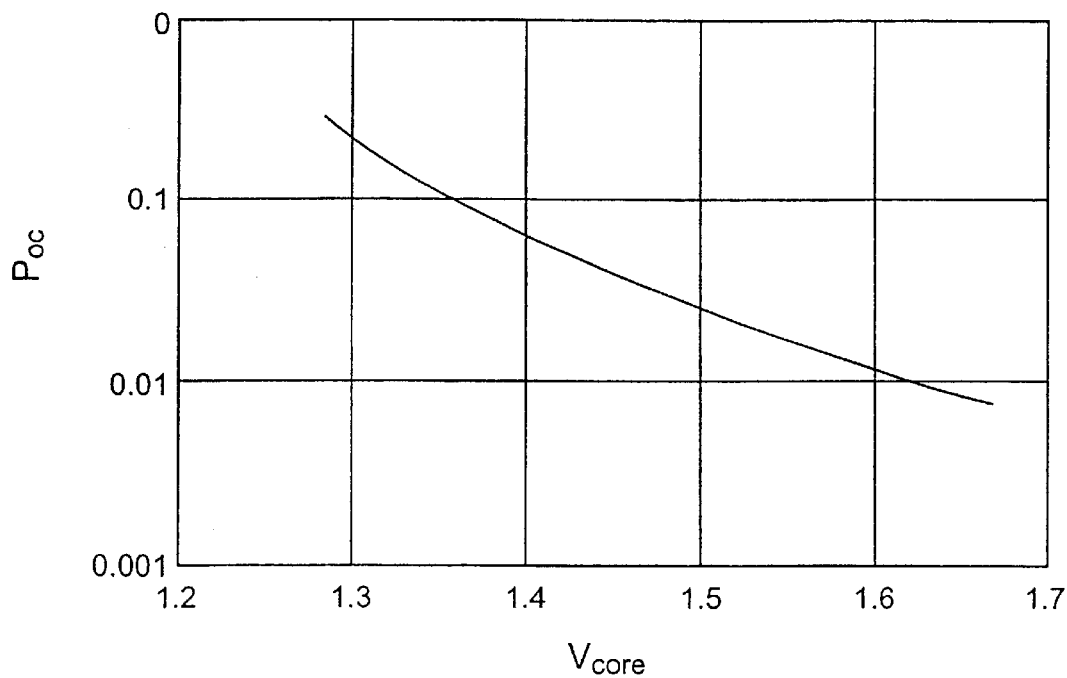
FIG. 6 is a chart showing a relationship between the ratio of optical power propagating through the outer cladding region to the total power and the V value of core region.

FIGS. 3 to 6 are charts showing changes in optical characteristics in the optical fibers 10A and 10B when mode field diameter is made variable by changing sizes while keeping the ratios between each dimension constant. The abscissa in each of FIGS. 3 and 4 indicates the mode field diameter MFD, the ordinate in FIG. 3 indicates the chromatic dispersion $D_{1550}$ at a wavelength of 1550 nm, and the ordinate in FIG. 4 indicates the chromatic dispersion slope $S_{1550}$ at a wavelength of 1550 nm. FIG. 5 shows relationships between the ratio $P_{oc}$ of optical power propagating through the outer cladding region in the optical fiber 10B and optical characteristics. In FIG. 5, the abscissa indicates the ratio $P_{oc}$ of optical power propagating through the outer cladding region to the total power, whereas the left and right ordinates indicate the chromatic dispersion $D_{1550}$ and chromatic dispersion slope $S_{1550}$ at a wavelength of 1550 nm, respectively. FIG. 6 shows the relationship between the ratio $P_{oc}$ of optical power propagating through the outer cladding region to the total power in the optical fiber 10B and fiber size, in which the abscissa and ordinate indicate the V value of core and the ratio $P_{oc}$ of optical power, respectively. Here, the V value of core is a value proportional to size, and is defined by:

$$V = k\alpha\sqrt{n_0^2 - n_2^2} \qquad (3)$$

where $n_0$ and $n_2$ are respective refractive indices of the core and outer cladding, and k is the wave number in vacuum.

FIGS. 3 and 4 indicate that the optical fiber 10B has negative dispersion and dispersion slope with greater absolute values than those of the optical fiber 10A, respectively. For example, when MFD=7 $\mu$m, while $D_{1550}$=–90 ps/nm/km and $S_{1550}$=–0.25 ps/nm²/km in the optical fiber 10A, $D_{1550}$=–107 ps/nm/km and $S_{1550}$=–0.84 ps/nm²/km in the optical fiber 10B. Since the negative dispersion and chromatic dispersion slope have greater absolute values, the length required for compensating for positive dispersion and chromatic dispersion slope can be made shorter, whereby the optical fiber 10B can be considered more suitable for compensating for positive dispersion and chromatic dispersion slope than the optical fiber 10A.

FIG. 5 indicates that a negative dispersion and a negative dispersion slope can be obtained when the ratio $P_{oc}$ of optical power propagating through the outer cladding region to the total power is 0.008 or greater. It also indicates that negative dispersion and negative dispersion slope with particularly greater absolute values can be obtained when the ratio $P_{oc}$ of optical power propagating through the outer cladding region to the total power is 0.1 or greater. As shown in FIG. 6, $V_{core} \leq 1.63$ in order to realize that $P_{oc} \geq 0.008$, and $V_{core} \leq 1.34$ in order to realize that $P_{oc} \geq 0.1$.

As explained in the foregoing, unlike the conventional air-clad optical fiber, the optical fiber 10B in accordance with the first embodiment can realize a low chromatic dispersion (having a large negative value) and a low chromatic dispersion slope (having a large negative value). Also, its chromatic dispersion and chromatic dispersion slope have greater negative values than those in the impurity-doped type optical fiber 10A. Therefore, it is suitable for compensating for the positive chromatic dispersion and positive chromatic dispersion slope of optical transmission line. Also, its birefringence is low. Further, since the glass refractive index of core is higher than the glass refractive index of cladding unlike the conventional microstructured optical fiber, the splicing loss caused by collapsing of bores at the time of fusion is low. Also, since the number of bores is small, i.e., 8, the making is easy, and strength is high. In particular, negative chromatic dispersion and negative chromatic dispersion slope having greater absolute values are obtained when the ratio of power propagating through the outer cladding to the total power is 0.1 or greater.

Second Embodiment

Figure 7:
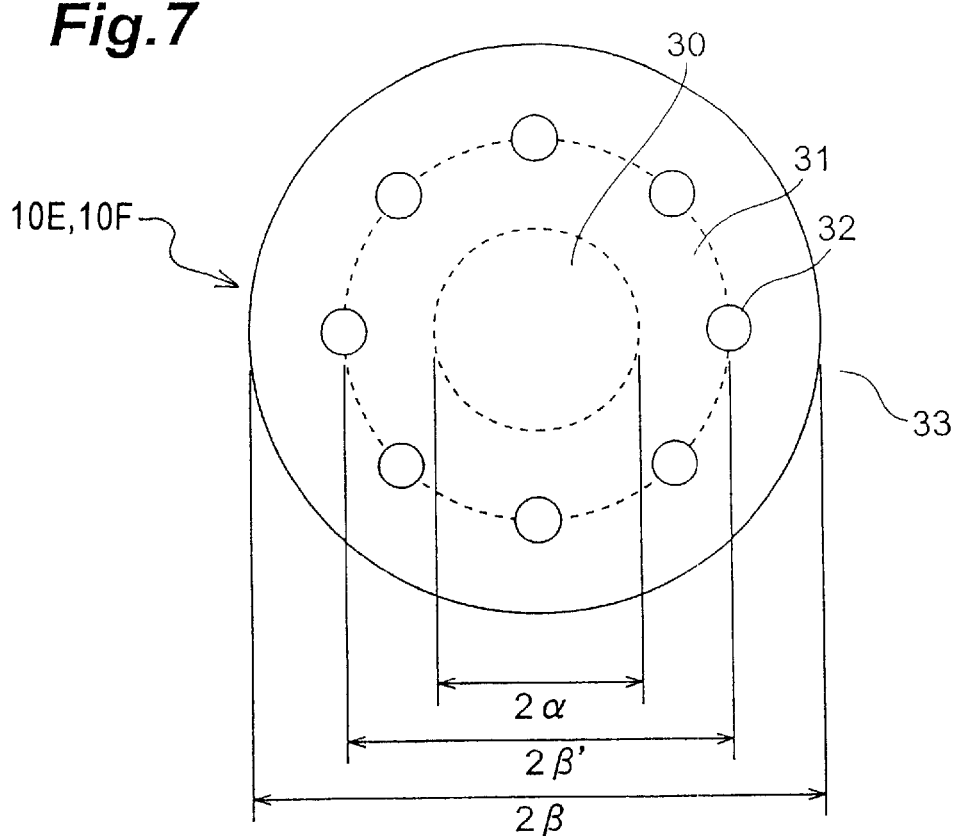
FIG. 7 is a sectional view of an optical fiber in accordance with the second embodiment of the present invention.
Figure 8:
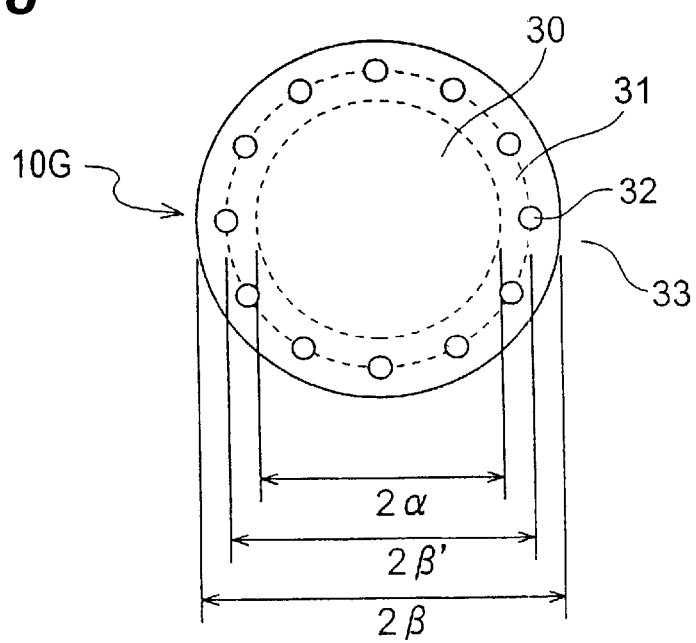
FIG. 8 is a sectional view of an optical fiber in accordance with the second embodiment of the present invention.

FIGS. 7 and 8 are sectional views of optical fibers 10E, 10F, and 10G in accordance with the second embodiment of the present invention. A core region 30 and an inner cladding region 31 are formed by silica glass (having a refractive index $n_0$) doped with Ge, whereas the inner cladding region 31 includes a plurality of microstructures 32 (having a refractive index $n_3$). In the inner cladding region 31, the main medium is Ge-doped silica glass ($n_0$=1.46567), whereas the auxiliary medium forming the microstructures 32 is air ($n_3$=1). The microstructures 32, each having a circular form with a radius r, are disposed on a circle having a radius $\beta'$ at substantially equal intervals. The outer periphery of inner cladding region is a circle having a radius $\beta$. The boundary between the core region 30 and inner cladding region 31 is defined by a circle having a radius of $\alpha=2\beta-\beta'$. The outer cladding region 33 is formed from pure silica glass. The impurity-doped type optical fiber 10A shown in FIG. 2 is used for comparison.

Structural parameters of the optical fibers 10E and 10F shown in FIG. 7 are as follows. Namely, for the optical fiber 10E, $\alpha$=1.02 $\mu$m, $\beta'$=1.97 $\mu$m, and r=0.253 $\mu$m. Here, the average refractive index $n_1$ of inner cladding region 31 is 1.43883. For the optical fiber 10F, $\alpha$=1.25 $\mu$m, $\beta'$=1.87 $\mu$m, and r=0.215 $\mu$m. Here, the average refractive index $n_1$ of inner cladding region 31 is 1.43395.

For the optical fiber 10G shown in FIG. 8, $\alpha$=1.50 $\mu$m, $\beta'$=1.84 $\mu$m, and r=0.155 $\mu$m. Here, the average refractive index $n_1$ of inner cladding region 31 is 1.4211.

Figure 9:
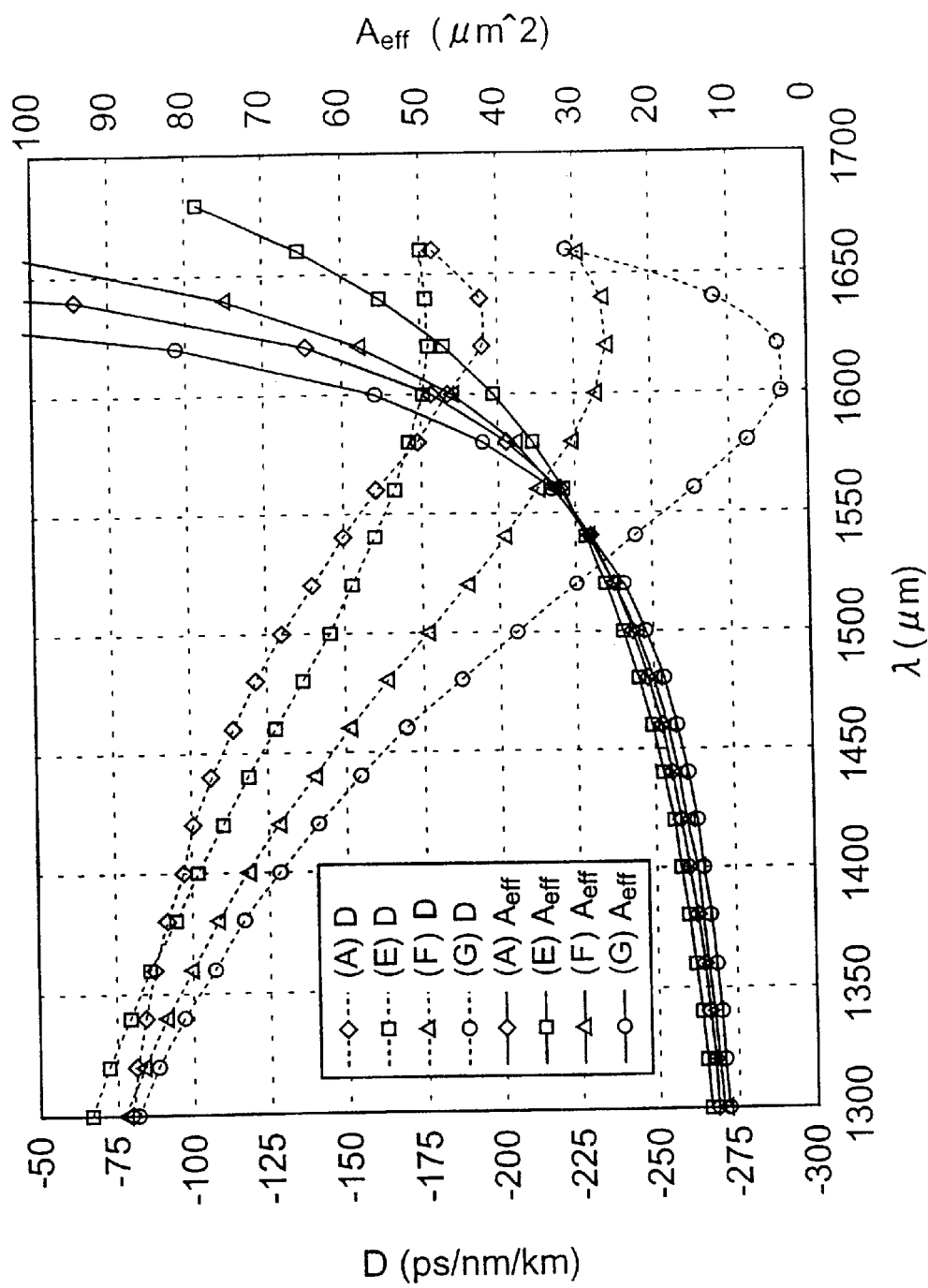
FIG. 9 is a chart showing results of calculation of relationships between the light wavelength $\lambda$, chromatic dispersion D, and effective core area $A_{eff}$ in optical fibers in accordance with the second embodiment.

FIG. 9 shows results of calculation of relationships between light wavelength $\lambda$, chromatic dispersion D, and effective core area $A_{eff}$ in the optical fibers 10E to 10G having the foregoing structures in accordance with the second embodiment. In this chart, the abscissa, left ordinate, and right ordinate indicate the light wavelength $\lambda$, chromatic dispersion D, and effective core area $A_{eff}$, respectively. While the effective core area $A_{eff}$=30 $\mu$m² in each of the optical fibers 10A, 10E, 10F, and 10G, the chromatic dispersion D successively increases so as to become –155 ps/nm/km in the optical fiber 10A, –164 ps/nm/km in the optical fiber 10E, –208 ps/nm/km in the optical fiber 10F, and –254 ps/nm/km in the optical fiber 10G. The rate at which the effective core area $A_{eff}$ increases relative to the increase in wavelength is lower in the optical fibers 10E and 10F than in the optical fiber 10A. The fact that the rate at which the effective core area $A_{eff}$ increases relative to the increase in wavelength is lower means that light is more tightly confined in the core, whereby the bending loss is low. Also, since the bending loss increases if the effective core area $A_{eff}$ is made larger, each of the optical fibers 10E and 10F can realize an effective core area $A_{eff}$ greater than that in the optical fiber 10A. Also, since the arrangement of microstructures in each of the optical fibers 10E, 10F, and 10G substantially has a quarter rotational symmetry, two polarization modes degenerate, whereby mode birefringence is low.

Figure 10:
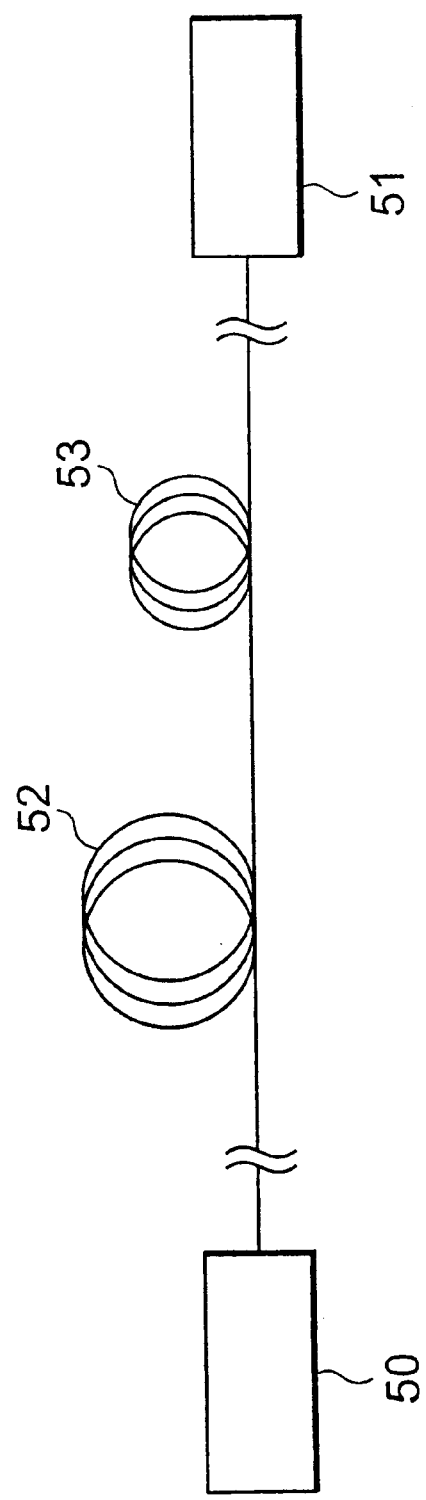
FIG. 10 is a schematic diagram of an optical communication system including an optical fiber in accordance with the second embodiment as a negative dispersion optical fiber.

Therefore, the optical fibers 10E to 10G in accordance with the second embodiment can realize a smaller chromatic dispersion (having a larger negative value), a lower bending loss, and a greater effective core area as compared with the impurity-doped type optical fiber 10A shown in FIG. 2. Since the chromatic dispersion has a larger negative value, the length required for compensating for a positive dispersion is shorter, and the effective core area is greater. Therefore, if an optical fiber in accordance with the second embodiment is used as a negative dispersion optical fiber in an optical communication system including an optical transmitter 50, an optical receiver 51, a positive dispersion optical fiber 52, and a negative dispersion optical fiber 53 as shown in FIG. 10, then the nonlinear optical effects in the negative dispersion optical fiber which deteriorates the transmission line quality can be suppressed, whereby a large-capacity optical communication system can be realized.

In addition to a main medium constituting an inner cladding region, microstructures made of an auxiliary medium having a refractive index different from that of the main medium are provided in the inner cladding region of the optical fiber in accordance with the present invention. On the other hand, the outer cladding region is constituted by a substantially homogeneous medium and includes no microstructures. Since microstructures made of the auxiliary medium having a refractive index lower than that of the main medium are provided, the average refractive index of inner cladding region can be made much lower than that in the case without the microstructures. As a result, favorable characteristics such as a dispersion with a larger negative value, a dispersion slope with a larger negative value, a larger effective core area, and a smaller bending loss can be obtained as compared with the conventional impurity-doped type optical fiber. Also, unlike the air-clad type optical fiber, the optical fiber of the present invention can realize a dispersion with a large negative value and a dispersion slope with a large negative value. This is because of the fact that the outer cladding region surrounding the inner cladding region including microstructures influences optical characteristics, such as chromatic dispersion characteristics. Further, since the outer cladding region is constituted by a substantially homogeneous medium and includes no microstructures, the number of microstructures to be provided can be drastically reduced compared to that in the conventional microstructured optical fiber. As a result, the optical fiber can easily be made with a favorable reproducibility using any of the method in which silica tubes are arranged and the method in which a preform is bored by use of a boring device, whereby the cost of manufacture can be cut down.

In the case where the microstructures comprise bores in particular, strengths against tension and lateral pressures improve as compared with the conventional microstructured optical fiber when the number of microstructures decreases, and the making and connecting become easier since the probability of absorption loss occurring due to OH group on surfaces of bores and water vapor within the bores decreases. Further, since the refractive index of core region is higher than that of outer cladding region, optical waveguide characteristics will not be lost even if bores are closed in the inner cladding, whereby fusion loss can be reduced.

The microstructures may be arranged such that a quarter rotational symmetry about the fiber axis substantially holds. As a consequence, two polarization modes can substantially degenerate, whereby birefringence can be made lower. Also, they may be arranged at substantially equal intervals on at least one of concentric circles centered at the fiber axis. As a consequence, two polarization modes can substantially degenerate, whereby birefringence can be made lower. Arranging the microstructures along a circle can also yield an effect approximately equivalent to uniformly changing the refractive index of an annular region including this circle. Therefore, designing can be made according to radial refractive index profiles as in the conventional impurity-doped optical fiber. As a consequence, systematic designing becomes easier. The microstructures may also be disposed at substantially equal intervals on a circle centered at the fiber axis. As a consequence, two polarization modes can substantially degenerate, whereby birefringence can be made lower. Also, systematic designing becomes easier. Further, since the number of microstructures is minimized, easiness in the making, high strength, and high reliability can be realized.

In the optical fiber in accordance with the present invention, the ratio of optical power propagating through the outer cladding region to the total power at a wavelength of 1550 nm can be made 0.008 or greater (more preferably 0.1 or greater). As a consequence, the outer cladding region can become not only a region for improving mechanical strength and so forth, but also a region actually influencing optical characteristics (chromatic dispersion characteristics in particular) of the optical fiber. In particular, when the ratio of optical power propagating through the outer cladding region to the total power is 0.008 or greater, a lower chromatic dispersion slope (having a larger negative value) can be realized. Also, when the ratio of optical power propagating through the outer cladding region to the total power is 0.1 or greater, a lower chromatic dispersion slope (having a larger negative value) can be realized.

Further employable is a configuration in which each of the medium of core region, the main medium of inner cladding region, and the medium of outer cladding region is silica-based glass which may be doped with impurities, whereas the auxiliary medium forming the microstructures in the inner cladding region is gas or vacuum. As a result, transmission loss can be kept low, whereas the average refractive index of inner cladding can be lowered greatly, so as to realize favorable characteristics such as a dispersion having a larger negative value than that in the conventional impurity-doped type optical fiber.

Third Embodiment

Figure 11:
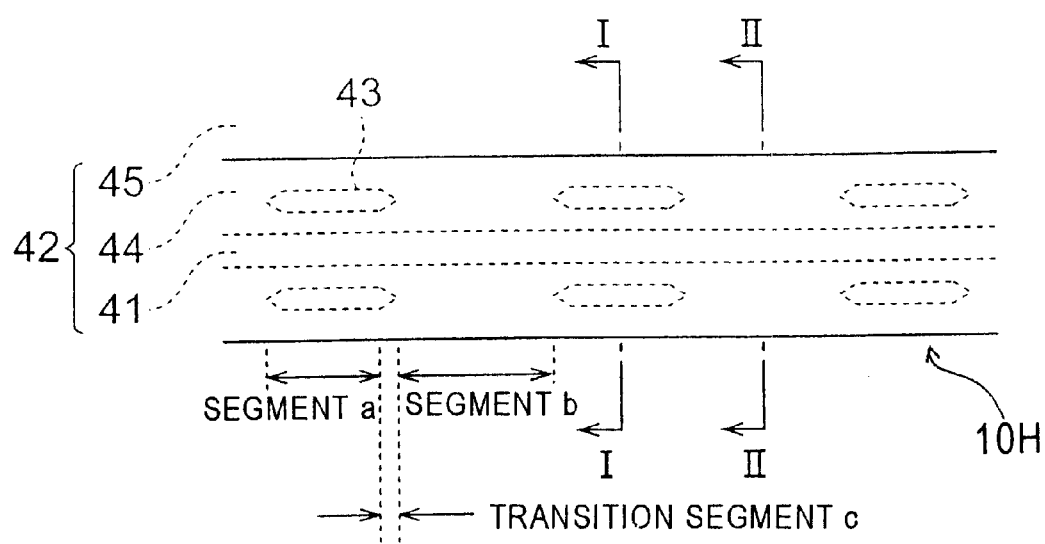
FIG. 11 is a sectional view of an optical fiber in accordance with the third embodiment in the fiber axis direction.
Figure 12A:
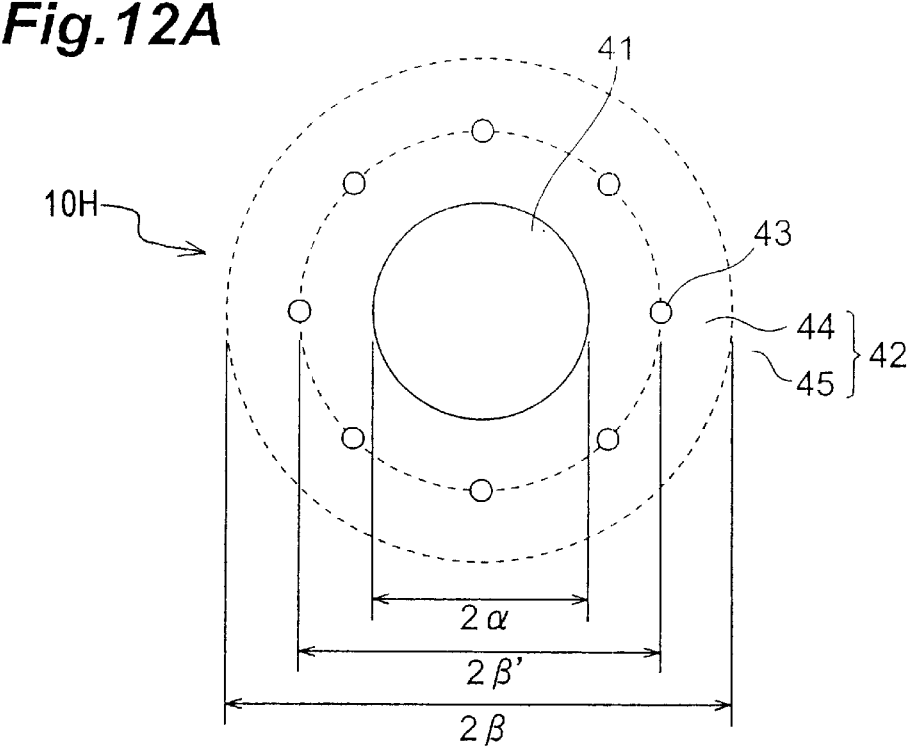
FIG. 12A is a sectional view of the optical fiber taken along the line I—I in FIG. 11.
Figure 12B:
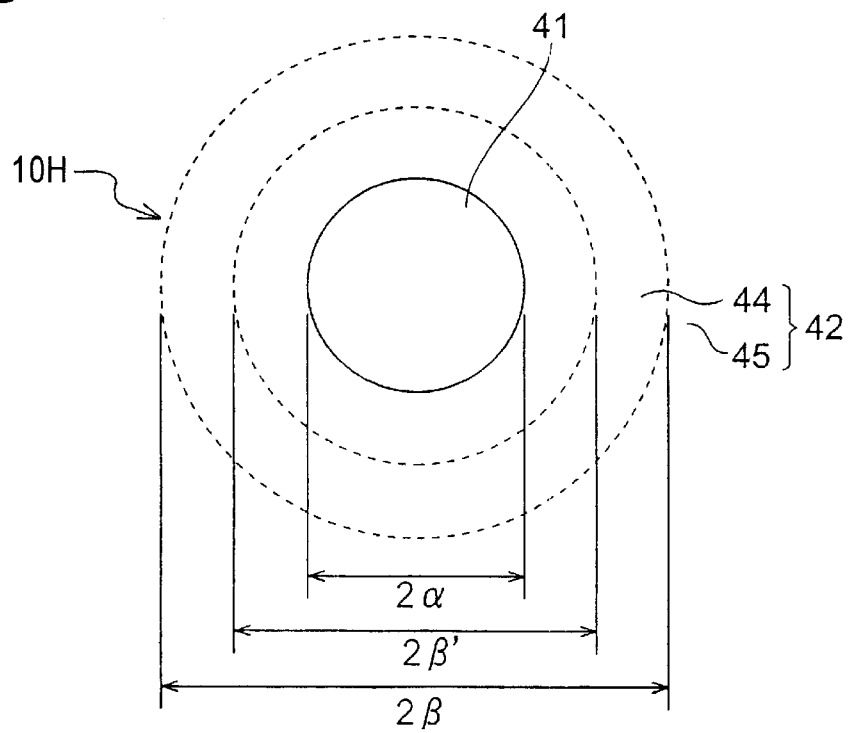
FIG. 12B is a sectional view of the optical fiber taken along the line II—II in FIG. 11.

FIG. 11 is a sectional view of an optical fiber 10H in accordance with the third embodiment of the present invention in the fiber axis direction. FIG. 12A is a sectional view of the optical fiber taken along the line I—I in FIG. 11, whereas 12B is a sectional view of the optical fiber taken along the line II—II in FIG. 11. In the optical fiber 10H in accordance with the third embodiment, segments a and bare alternately disposed in the fiber axis direction. While the segment a includes bores 43 in its inner cladding region 44, the segment b includes no bores 43. A transition segment c exists between the segments a and b, whereas the cross sectional area of bore changes along the fiber axis in the transition segment c. Typically, each of the segments a and b has a length of at least 100 m. On the other hand, the transition segment c may have a length of 1 m or less. Here, the influence of optical characteristics of the transition segment c upon optical characteristics of the whole optical fiber is negligible. The diameter of core region 41 is $2\alpha$, which is the same value in the segments a and b. In the segment a, as shown in FIG. 12A, eight bores 43 (each having a radius of r) are arranged at equally spaced intervals on a circle having a radius $\beta'$ centered at the fiber axis. The refractive index distribution in the segment a corresponds to that having a depressed portion which is an annular region including the bores 43, whereas the refractive index distribution in the segment b corresponds to that without the depressed portion. As in the first and second embodiments, the outside radius of inner cladding region 44 is set as $\beta=2\beta'-\alpha$, and the outside radius of outer cladding region 45 is $\gamma$.

Structural parameters of the optical fiber 10H are as follows: $\alpha=1.70$ μm, $\beta'=2.74$ μm, $r=0.25$ μm. The core region 41 is silica having a Ge concentration of 12 mol %, the main medium of inner cladding region 44 is silica having a Ge concentration of 5.0 mol %, and the outer cladding region 45 is pure silica. While the segment a includes the bores 43, the segment b includes no bores 43, whereby the average refractive index $n_1$ of inner, cladding region 44 is 1.435 in the segment a, and 1.452 in the segment b, thus varying along the fiber axis.

Figure 13:
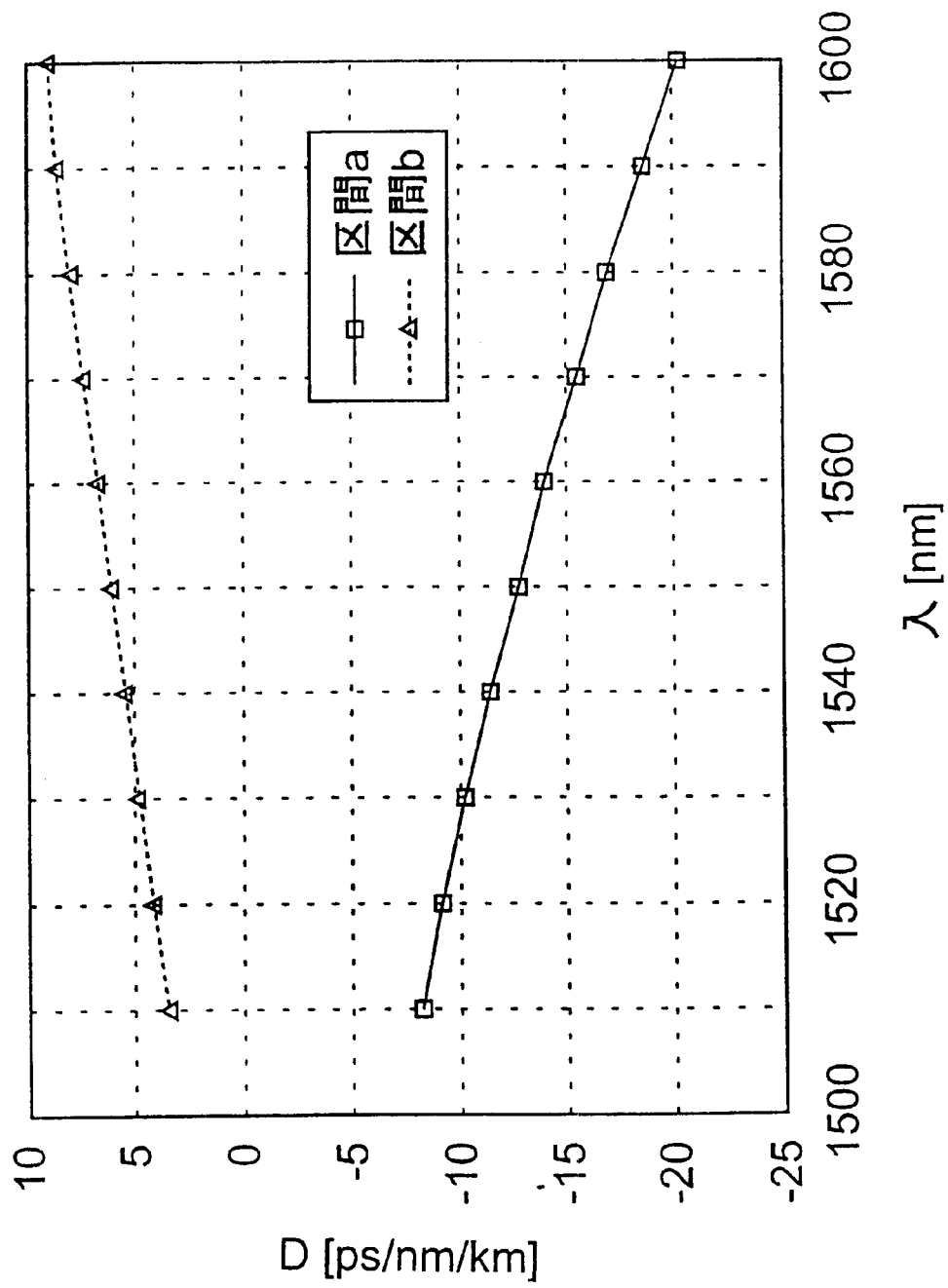
FIG. 13 is a chart showing results of numerical simulation of chromatic dispersion characteristics in segments a and b in the optical fiber in accordance with the third embodiment.

FIG. 13 is a chart showing results of numerical simulation of chromatic dispersion D in the segments a and b in the optical fiber 10H as a function of wavelength. Here, as shown in FIG. 13, the wavelength ranges from 1510 nm to 1600 nm. The segment a has a negative chromatic dispersion and a negative chromatic dispersion slope, whereas the segment b has a positive chromatic dispersion and a positive chromatic dispersion slope. In particular, the chromatic dispersion D and chromatic dispersion slope S at a wavelength of 1550 nm are:

D=−12.8 ps/nm/km, and

S=−0.129 ps/nm²/km in the segment a; whereas

D=+6.16 ps/nm/km, and

S=+0.065 ps/nm²/km in the segment b.

At 1550 nm, the ratio of optical power $P_{oc}$ propagating through the outer cladding region to the total power is 0.048.

Figure 14:
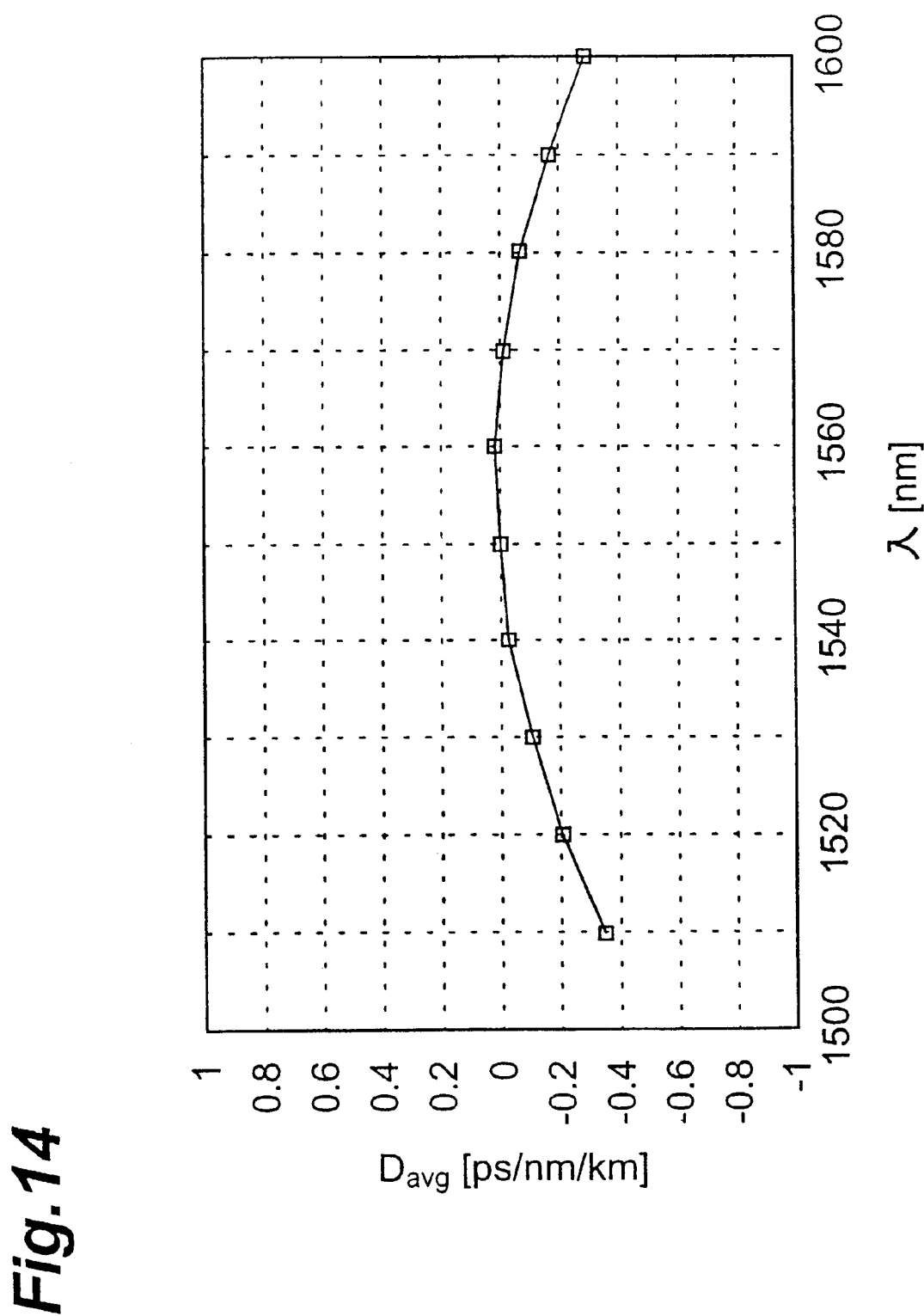
FIG. 14 is a chart showing the average chromatic dispersion $D_{avg}$ in the case where a segment a having a length of 0.48 is combined with a segment b having a length of 1 in the optical fiber in accordance with the third embodiment.

FIG. 14 is a chart showing the average chromatic dispersion $D_{avg}$ in the case where a fiber is constituted by segments a having total length of 0.48, and segments b having total length of 1. Here, when a fiber is constituted by fiber segments i (i=1, 2, ..., n) having chromatic dispersions $D_i$ and lengths $L_i$, the average chromatic dispersion $D_{avg}$ is defined by the following expression. Also, letting L be the length of the fiber, the total chromatic dispersion is defined by $D_{avg}L$.

$$D_{avg} = \frac{\sum_{i=1}^{n} D_i L_i}{\sum_{i=1}^{n} L_i} \quad (4)$$

Similarly, when a fiber is constituted by fiber segments i (i=1, 2, ..., n) having chromatic dispersion slopes $S_i$ and lengths $L_i$, the average chromatic dispersion slope $S_{avg}$ is defined by the following expression. Also, the total chromatic dispersion slope is defined by $S_{avg}L$.

$$S_{avg} = \frac{\sum_{i=1}^{n} S_i L_i}{\sum_{i=1}^{n} L_i} \quad (5)$$

The chromatic dispersion in a fiber segment where the chromatic dispersion can be considered constant is referred to as local chromatic dispersion. It is thus defined so as to be distinguished from the total chromatic dispersion in the whole transmission line constituted by such fiber segments.

As shown in FIG. 14, the average chromatic dispersion $D_{avg}$ and average chromatic dispersion slope $S_{avg}$ become substantially zero at a wavelength of 1550 nm. As a consequence, in an optical fiber transmission line having segments a and b at the above-mentioned ratio, the absolute value of average chromatic dispersion becomes 0.4 ps/nm/km or less in a wide wavelength band of 1510 nm to 1600 nm. On the other hand, as shown in FIG. 13, the absolute value of local chromatic dispersion is large, i.e., 4 ps/nm/km or greater. Though the absolute value of local chromatic dispersion becomes smaller in a part of fiber segment included in the transition segment, the length of such a fiber segment can be made shorter (e.g., 1 m or less), whereby the magnitude of influence of nonlinear optical phenomena in the transition segment is negligible. Therefore, the distortion of optical pulse due to cumulative dispersion and the deterioration in transmission quality due to nonlinear optical phenomena caused by optical signals having different wavelengths can be suppressed at the same time.

Thus, in the optical fiber in accordance with the third embodiment, it is possible to change the refractive index distribution drastically within the fiber cross section along the fiber axis, thereby greatly altering chromatic dispersion relative to the wavelength along the fiber axis. As a consequence, chromatic dispersion characteristics which are hard to realize or impossible in an optical fiber constituted by a single kind of fiber segments can be realized. In particular, characteristics with a large absolute value of local chromatic dispersion and a small absolute value of total chromatic dispersion can be realized.

As compared with conventional dispersion management fibers, in the optical fiber in accordance with this embodiment, it is possible to change the refractive index distribution within the fiber cross section more drastically along the fiber axis, thereby altering chromatic dispersion relative to the wavelength more greatly along the fiber axis. Therefore, it is possible to realize an optical fiber having a fiber segment a whose chromatic dispersion is lower than −10 ps/nm/km in a wavelength band of 1510 nm to 1600 nm and a fiber segment b whose chromatic dispersion is higher than +5 ps/nm/km in this wavelength band, in which the absolute value of average chromatic dispersion in this wavelength band is less than 0.4 ps/nm/km, the chromatic dispersion slope of fiber segment a is negative in this wavelength band, and the chromatic dispersion slope of fiber segment b is positive in this wavelength band. As a result, as compared with the prior art, the wavelength range where the absolute value of total chromatic dispersion becomes lower than a predetermined value can be widened, so as to enhance the transmission capacity.

Further, in the optical fiber in accordance with this embodiment, a plurality of segments b including no bores are arranged at intervals along the fiber axis. As a result, the optical fiber can be cleaved at the segments b, so as to be fusion-spliced to other optical fibers. Here, unlike the conventional microstructured optical fiber, the problems of the deform or disappearance of microstructures due to fusion and block for observing the core due to microstructures do not occur, whereby the fusion splicing becomes easier than that in the conventional microstructured optical fiber. Also, there are no bores open to the outside air at end faces, whereby no contaminants enter the bores. Therefore, low-loss mechanical connection can be realized by use of a refractive index matching liquid. Further, even if a side face is damaged in a part of fiber segments a and thereby a contaminant such as water enters bores, the contaminant will not spread over the whole fiber, whereby the tolerance to damages is higher than that in the conventional microstructured optical fiber.

Fourth Embodiment

Figure 15A:
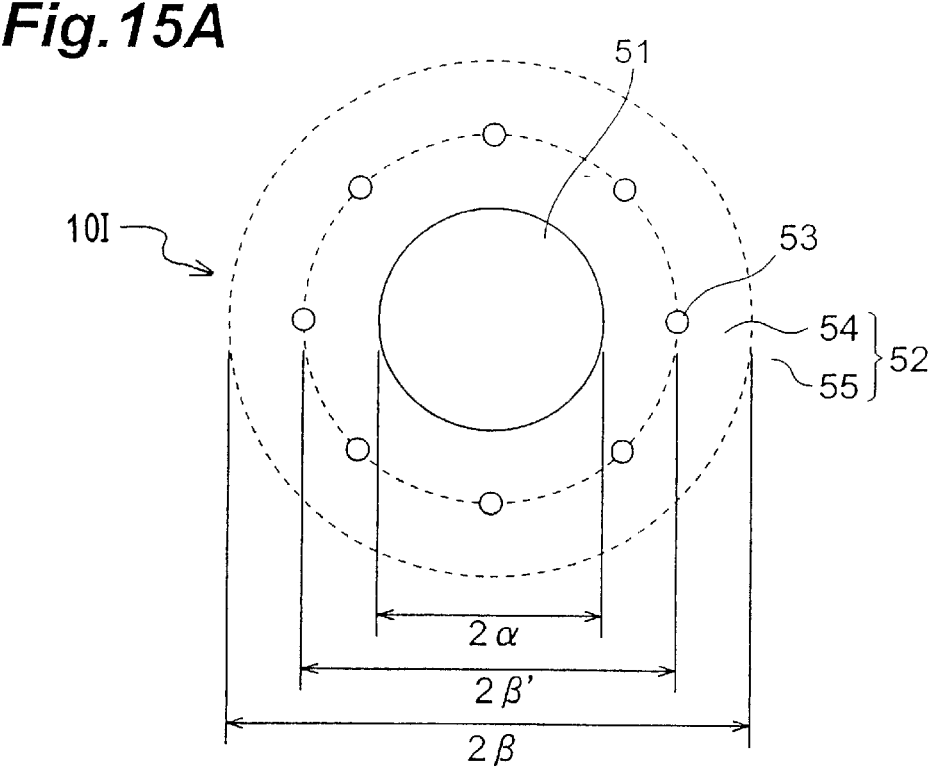
Figure 15B:
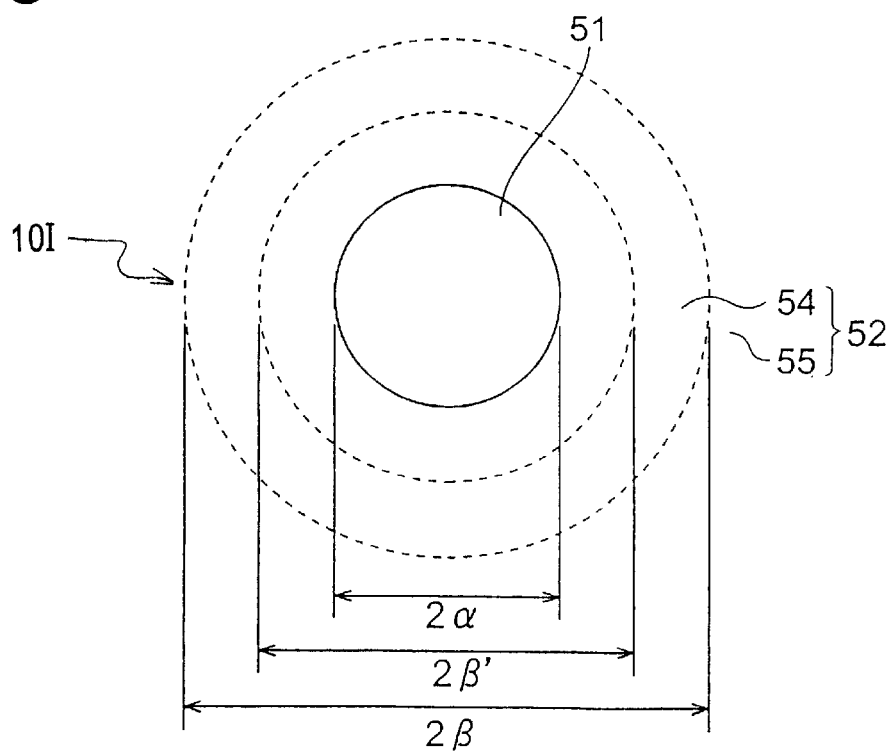
FIG. 15B is a sectional view of the optical fiber in accordance with the fourth embodiment in its segment b.

FIGS. 15A and 15B are sectional views of an optical fiber 10I in accordance with the fourth embodiment of the present invention in segments a and b thereof, respectively. In the optical fiber 10I in accordance with the fourth embodiment, as in the optical fiber 10H in accordance with the third embodiment, segments a and b are alternately disposed along the fiber axis. While the segment a includes bores 53 in its inner cladding region 54, the segment b includes no bores 53. A transition segment c exists between the segments a and b, whereas the cross sectional area of bore changes along the fiber axis in the transition segment c. Typically, each of the segments a and b has a length of at least 100 m. On the other hand, the transition segment c may have a length of 1 m or less. Here, the influence of optical characteristics of the transition segment c upon optical characteristics of the whole optical fiber is negligible. The diameter of core region 51 is 2α, which is the same value in the segments a and b. In the segment a, as shown in FIG. 15A, eight bores 53 (each having a radius of r) are arranged at equally spaced intervals on a circle having a radius β' centered at the fiber axis. The refractive index distribution in the segment a corresponds to that having a depressed portion which is an annular region including the bores 53, whereas the refractive index distribution in the segment b corresponds to that without the depressed portion. As in the first to third embodiments, the outside radius of inner cladding region 54 is set as β=2β'−α.

Structural parameters of the optical fiber 10I are as follows: α=1.74 μm, β'=2.81 μm, r=0.39 μm. The core region 51 is silica (whose refractive index $n_0$=1.465) having a Ge concentration of 14 mol %, the main medium of inner cladding region 54 and the outer cladding region 55 are pure silica (whose refractive index $n_2$=$n_3$=1.444). While the segment a includes the bores 53, the segment b includes no bores 53, whereby the average refractive index $n_1$ of inner cladding region 54 varies along the fiber axis.

Figure 16:
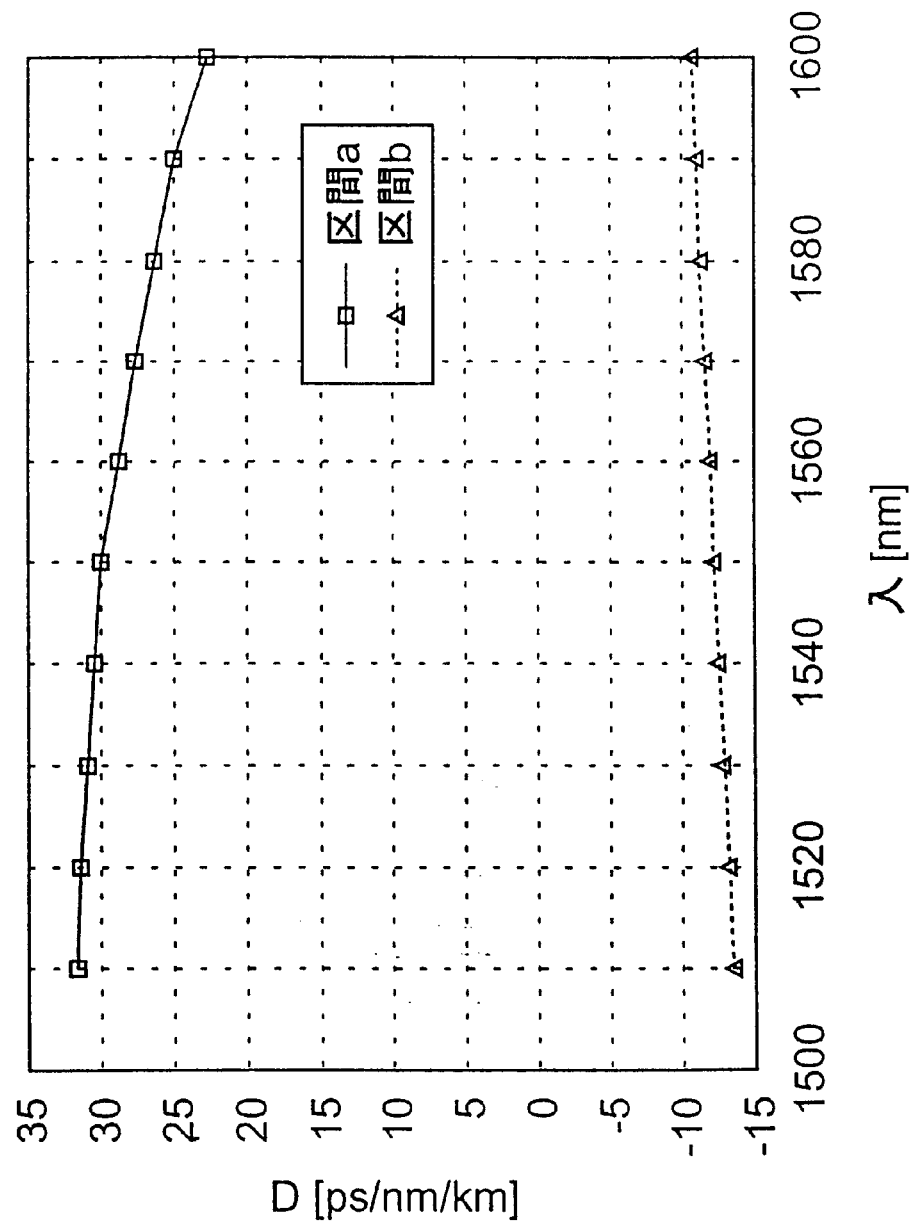
FIG. 16 is a chart showing results of numerical simulation of chromatic dispersion characteristics in segments a and b in the optical fiber in accordance with the fourth embodiment.

FIG. 16 is a chart showing results of numerical simulation of chromatic dispersion in the segments a and b in the optical fiber 10I as a function of wavelength. Here, as shown in FIG. 16, the wavelength ranges from 1510 nm to 1600 nm. The segment a has a positive chromatic dispersion and a negative chromatic dispersion slope, whereas the segment b has a negative chromatic dispersion and a positive chromatic dispersion slope. In particular, the chromatic dispersion D and chromatic dispersion slope S at a wavelength of 1550 nm are:

D=+29.7 ps/nm/km, and

S=−0.079 ps/nm$^2$/km in the segment a; whereas

D=−12.4 ps/nm/km, and

S=+0.033 ps/nm$^2$/km in the segment b.

At 1550 nm, the ratio of optical power $P_{oc}$ propagating through the outer cladding region to the total power is 0.0081.

Figure 17:
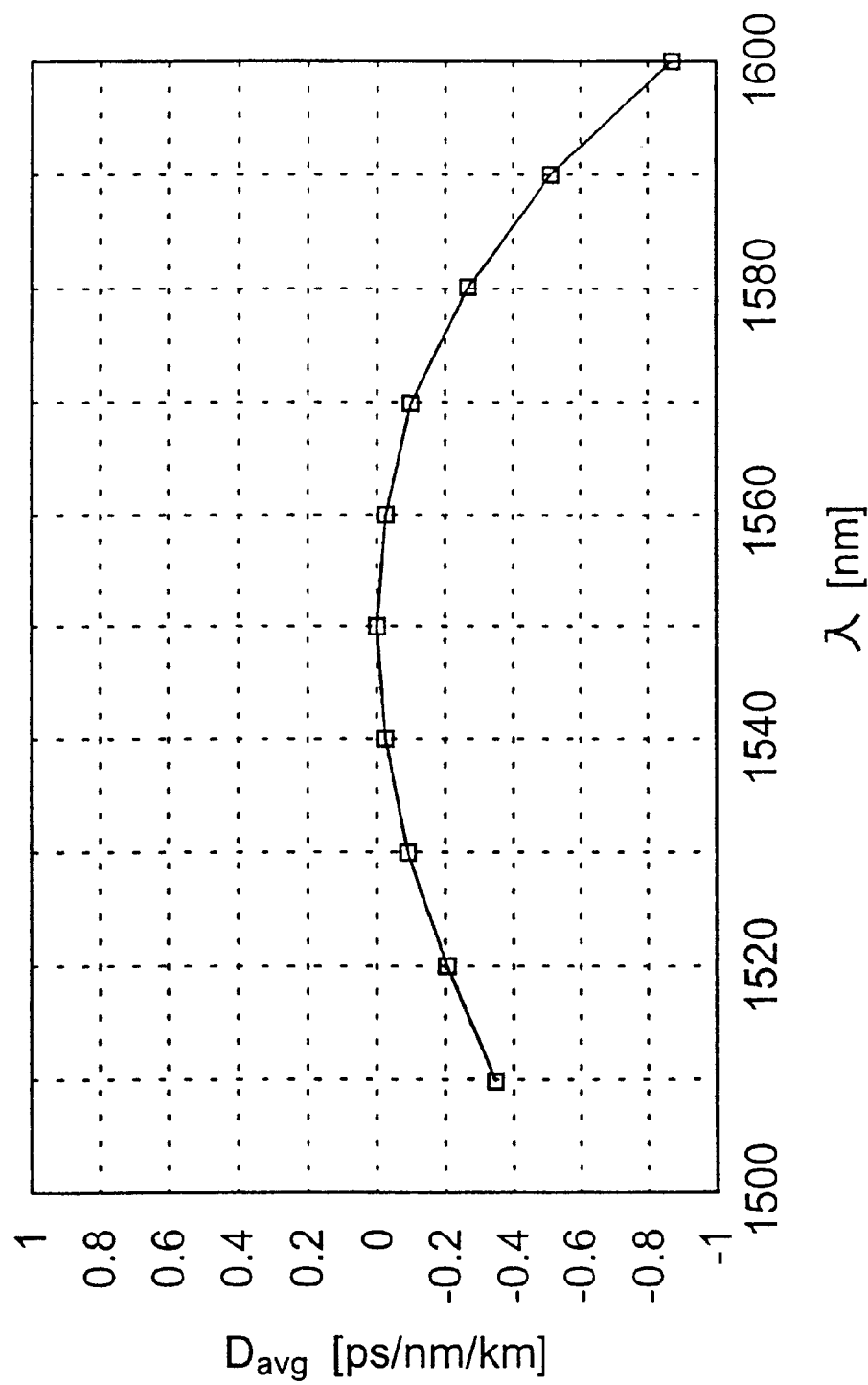
FIG. 17 is a chart showing the average chromatic dispersion $D_{avg}$ in the case where a segment a having a length of 0.42 is combined with a segment b having a length of 1 in the optical fiber in accordance with the fourth embodiment.

FIG. 17 is a chart showing the average chromatic dispersion $D_{avg}$ in the case where a fiber is constituted by segments a having total length of 0.42 and segments b having total length of 1. The average chromatic dispersion $D_{avg}$ and average chromatic dispersion slope $S_{avg}$ become substantially zero at a wavelength of 1550 nm. As a consequence, in an optical fiber transmission line having segments a and b at the above-mentioned ratio, the absolute value of average chromatic dispersion becomes 1 ps/nm/km or less in a wide wavelength band of 1510 nm to 1600 nm. On the other hand, as shown in FIG. 16, the absolute value of local chromatic dispersion is large, i.e., 10 ps/nm/km or greater. Therefore, the distortion of optical pulse due to total dispersion and the deterioration in transmission quality due to nonlinear optical phenomena caused by optical signals having different wavelengths can be suppressed at the same time.

Thus, the optical fiber in accordance with the fourth embodiment can also widely change the refractive index distribution within the fiber cross section along the fiber axis, thereby greatly altering the relationship of chromatic dispersion to wavelength along the fiber axis. As a consequence, chromatic dispersion characteristics which are hard to realize or impossible in an optical fiber constituted by a single kind of fiber segments can be realized. In particular, characteristics with a large absolute value of local chromatic dispersion and a small absolute value of total chromatic dispersion can be realized.

By designing the wavelength characteristics of chromatic dispersion along fiber axis appropriately, it is possible to realize an optical fiber having a fiber segment a whose chromatic dispersion in a wavelength band of 1510 nm to 1600 nm is higher than 20 ps/nm/km and a fiber segment b whose chromatic dispersion in this wavelength band is lower than −10 ps/nm/km, in which the absolute value of average chromatic dispersion in this wavelength band is smaller than 1 ps/nm/km. As compared with conventional dispersion management fibers, the optical fiber in accordance with this embodiment can change the refractive index distribution within the fiber cross section more drastically along the fiber axis, so as to alter chromatic dispersion relative to wavelength more greatly along the fiber axis, thereby yielding a larger absolute value of local chromatic dispersion in each segment. As a result, the distortion of optical pulse due to total chromatic dispersion can be suppressed, and the deterioration in transmission quality due to nonlinear optical phenomena caused by optical signals having different wavelengths can be made lower than that in the prior art.

Further, as compared with conventional dispersion management fibers, the optical fiber in accordance with this embodiment can change the refractive index distribution within the fiber cross section more drastically along the fiber axis, thereby altering wavelength characteristics of chromatic dispersion more greatly along the fiber axis. Therefore, it is possible to realize an optical fiber having a fiber segment a whose chromatic dispersion is higher than 20 ps/nm/km in a wavelength band of 1510 nm to 1600 nm and a fiber segment b whose chromatic dispersion is lower than −10 ps/nm/km in this wavelength band, in which the absolute value of average chromatic dispersion in this wavelength band is less than 1 ps/nm/km, the chromatic dispersion slope of fiber segment a is negative in this wavelength band, and the chromatic dispersion slope of fiber segment b is positive in this wavelength band. As a result, as compared with the prior art, the wavelength range in which the absolute value of total chromatic dispersion becomes lower than a predetermined value can be widened, so as to enhance the transmission capacity.

As explained in the foregoing, the optical fiber in accordance with the present invention comprises a core region constituted by a substantially homogeneous medium; an inner cladding region surrounding the core region; and an outer cladding region, constituted by a substantially homogeneous medium, surrounding the inner cladding region; the core region, inner cladding region, and outer cladding region extending along the fiber axis; the average refractive index $n_0$ of core region, the average refractive index $n_1$ of inner cladding region, and the average refractive index $n_2$ of outer cladding region satisfying the relationship of $n_1<n_2<n_0$; wherein at least three microstructures each extending along the fiber axis and comprising an auxiliary medium having a refractive index different from that of a main medium constituting the inner cladding region are included in the inner cladding region.

Such a configuration can make the average refractive index of inner cladding region much lower than that in the case without the microstructures, whereby a larger negative dispersion, a larger negative dispersion slope, a larger effective core area, and a smaller bending loss can be obtained as compared with the conventional impurity-doped type optical fiber. Also, the outer cladding region influences optical characteristics unlike the air-clad type optical fiber, whereby the optical fiber of the present invention can realize a dispersion with a large negative value and a dispersion slope with a large negative value as compared with the conventional air-clad type optical fiber. Further, since the number of microstructures to be introduced can greatly be reduced, the optical fiber can be made easily with a favorable reproducibility, and the cost of manufacture can be cut down. Also, as compared with the conventional microstructured optical fiber, strengths against tension and lateral pressures improve, and the probability of absorption loss occurring due to OH group on surfaces of bores and water vapor within the bores decreases, whereby the making and connecting become easier. Further, since the refractive index of core region is higher than that of outer cladding region, the waveguiding function of the fiber will not be lost even if bores are closed in the inner cladding, whereby attenuation due to the fusion splice can be reduced.

What is claimed is:

1. An optical fiber comprising a core region constituted by a substantially homogeneous medium; an inner cladding region surrounding said core region; and an outer cladding region, constituted by a substantially homogeneous medium, surrounding said inner cladding region; wherein said core region, inner cladding region, and outer cladding region are regions extending along a fiber axis and influencing optical characteristics; wherein an average refractive index $n_0$ of said core region, an average refractive index $n_1$ of said inner cladding region, and an average refractive index $n_2$ of said outer cladding region satisfy the relationship of $$n_1 < n_2 < n_0;$$

and wherein said inner cladding region includes at least three microstructures each extending along said fiber axis and comprising an auxiliary medium having a refractive index different from that of a main medium constituting said inner cladding region.

2. An optical fiber according to claim 1, wherein a ratio of optical power propagating through said outer cladding region to a total power at a predetermined wavelength is at least 0.008.

3. An optical fiber according to claim 2, wherein the ratio of optical power propagating through said outer cladding region to the total power at said predetermined wavelength is at least 0.1.

4. An optical fiber according to claim 2, wherein the number of microstructures included in said inner cladding region is 50 or less.

5. An optical fiber according to claim 2, wherein said microstructures in said inner cladding region are arranged such that a quarter rotational symmetry about said fiber axis substantially holds.

6. An optical fiber according to claim 5, wherein said microstructures in said inner cladding region are arranged at substantially equal intervals on at least one concentric circle centered at said fiber axis.

7. An optical fiber according to claim 6, wherein said microstructures in said inner cladding region are arranged at substantially equal intervals on a circle centered at said fiber axis.

8. An optical fiber according to claim 2, wherein chromatic dispersion of a fundamental mode of said optical fiber is lower than −100 ps/nm/km.

9. An optical fiber according to claim 2, wherein, at a predetermined wavelength, said optical fiber has a positive chromatic dispersion and a negative chromatic dispersion slope.

10. An optical fiber according to claim 2, wherein said medium of core region, said main medium of inner cladding region, and said medium of outer cladding region are pure or doped silica glass; and wherein said auxiliary medium of inner cladding region is gas or vacuum.

11. An optical fiber communication system comprising an optical transmitter, an optical fiber transmission line, and an optical receiver; wherein said optical fiber transmission line includes the optical fiber according to claim 2, and an optical fiber having a chromatic dispersion with a polarity different from that of said optical fiber's chromatic dispersion.

12. An optical fiber according to claim 2, wherein at least one of cross sectional area and refractive index of said microstructures in said inner cladding region changes along the fiber axis.

13. An optical fiber according to claim 12, comprising a first fiber segment having, at a predetermined wavelength, a chromatic dispersion higher than a predetermined positive value; and a second fiber segment having, at said wavelength, a chromatic dispersion lower than a predetermined negative value.

14. An optical fiber according to claim 13, wherein said first fiber segment has a chromatic dispersion higher than +1 ps/nm/km at said predetermined wavelength, said second fiber segment has a chromatic dispersion lower than −1 ps/nm/km at said predetermined wavelength, and the total length of fiber segments whose absolute value of chromatic dispersion at said wavelength is less than 1 ps/nm/km is not greater than 1/10 of the total length of optical fiber.

15. An optical fiber according to claim 13, wherein the chromatic dispersion slope of said first fiber segment at said wavelength and the chromatic dispersion slope of said second fiber segment at said wavelength have respective polarities different from each other.

16. An optical fiber according to claim 2, wherein a plurality of fiber segments without said auxiliary medium are disposed at intervals along the fiber axis.

* * * * *